US011104366B2

(12) United States Patent
Ouellette (10) Patent No.: US 11,104,366 B2
(45) Date of Patent: Aug. 31, 2021

(54) DEPLOYMENT SYSTEM FOR WHEEL UNITS ON SKI-MOUNTED VEHICLES

(71) Applicant: Michael J. Ouellette, Caribou, ME (US)

(72) Inventor: Michael J. Ouellette, Caribou, ME (US)

(*) Notice: Subject to any disclaimer, the term of this patent is extended or adjusted under 35 U.S.C. 154(b) by 105 days.

(21) Appl. No.: 16/214,473

(22) Filed: Dec. 10, 2018

(65) Prior Publication Data

US 2019/0176867 A1    Jun. 13, 2019

Related U.S. Application Data

(60) Provisional application No. 62/596,940, filed on Dec. 11, 2017.

(51) Int. Cl.
  *B62B 19/00* (2006.01)
  *B62B 13/18* (2006.01)
  *B62M 27/02* (2006.01)
  *B62B 17/02* (2006.01)
  *A63C 17/04* (2006.01)

(52) U.S. Cl.
  CPC .............. *B62B 13/18* (2013.01); *B62M 27/02* (2013.01); *A63C 17/045* (2013.01); *B62B 17/02* (2013.01); *B62B 19/00* (2013.01); *B62M 2027/025* (2013.01)

(58) Field of Classification Search
  CPC ..................................................... B62B 13/18
  See application file for complete search history.

(56) References Cited

U.S. PATENT DOCUMENTS

2002/0135141 A1* 9/2002 Ouellette ............... B62K 13/00
                                                                280/7.14

* cited by examiner

*Primary Examiner* — John D Walters
*Assistant Examiner* — James J Triggs (57) ABSTRACT

A deployment system for wheel units on ski-mounted vehicles, and in particular for use with snowmobile skis having deployable wheel systems, that requires little manual effort to deploy and retract.

30 Claims, 9 Drawing Sheets

DEPLOYMENT SYSTEM FOR WHEEL UNITS ON SKI-MOUNTED VEHICLES

BACKGROUND INFORMATION

Field of the Invention

The invention relates to deployment mechanisms for wheel systems, particularly those that are used with ski-mounted vehicles such as snowmobiles.

Description of the Prior Art

Snowmobiles are commonly known vehicles that are constructed to travel across snow and frozen surfaces. As is generally known, the snowmobile is driven by an endless drive track arranged at the rear end of the underside of the snowmobile. The front end of the snowmobile is supported on two skis, which glide across the surface of the snow. The skis typically have a carbide runner that runs along a portion of the bottom surfaces, to help keep the snowmobile traveling along a smooth track.

A disadvantage of snowmobiles is that the skis don't readily glide across gravel, hardtop, or other non-snow surfaces. This makes it difficult, if not impossible, to steer a snowmobile on these surfaces, because the skis do not respond properly to the steering operations initiated at the handlebars.

Efforts to make snowmobiles mobile on gravel or other surfaces have been undertaken over the years. Prior art includes conversion kits to replace the skis with wheels and deployable wheels that are essentially permanently affixed to the snowmobile ski. The conversion kits were intended to replace the skis on a semi-permanent basis, that is, to convert a snowmobile into a wheeled vehicle for an extended period of time, typically requiring that the ski be removed in order to mount the wheels.

Deployable wheel systems cure a number of the conventional problems associated with the conversion kits, and the inventor of the present invention is also the inventor of several patents for wheel units for snowmobiles, U.S. Pat. No. 6,527,282, issued 4 Mar. 2003; U.S. Pat. No. 6,824,147, issued 30 Nov. 2005; U.S. Pat. No. 6,932,359, issued 23 Aug. 2005; U.S. Pat. No. 8,801,001, issued 12 Aug. 2014; and U.S. Pat. No. 9,180,800, issued Nov. 10, 2014, and all of which are incorporated herein in their entirety by reference.

Snowmobiles, however, tend to be heavy machines, with the average weight ranging anywhere from 500 pounds to 800 pounds, with much of that weight distributed directly above the skis. This weight has the effect of making it difficult for some users to deploy a deployable wheel system because the wheels must inherently elevate the front of the snowmobile in order for the wheels to deploy beneath the ski. Frequently a user must lift the ski, and thus the front end of the snowmobile, in order to deploy the wheel beneath the ski.

What is needed, therefore, is a deployment system that easily deploys the wheel unit despite the weight of the snowmobile.

BRIEF SUMMARY OF THE INVENTION

The invention is a wheel deployment system that requires relatively little effort by a user to deploy and retract wheel units on ski-mounted vehicles such as a snowmobile. The system uses a linkage assembly that is leveraged in a manner that allows the average users to deploy and retract the wheels from a seated position on the vehicle. The system may be manually operated or have an automated or semi-automated operating mechanism. The system may include a locking device to secure the wheels in their deployed or retracted position.

The wheel deployment system may be constructed on top, or be affixed to the top, of a conventional ski. In this embodiment, one or more openings are cut in the ski to allow wheels to pass through the ski from a retracted position above the ski to a deployed position below the ski. Alternatively, the wheel deployment system may be affixed to the side of a ski, with a floor of the ski remaining intact and the wheels deploying and retracting from a position beside the ski.

When the wheel units are in their retracted position they are above the bottom surface of the ski and the vehicle operates in a normal manner similar to a vehicle that does not have wheel units. When the wheels are deployed, the skis are lifted off of the ground surface so that on the wheels are in contact with the surface, and as a result the vehicle is easy to drive and maneuver on non-snowy surfaces such as gravel and pavement.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-5 and 9 illustrate the first embodiment of a deployment system for wheel units on ski-mounted vehicles 100 according to the invention for use with a ski 1000, shown in FIGS. 6-8 and 10. The deployment system 100 includes a support structure 10, one or more deployable wheel units 30, and a deployment assembly 50. In this embodiment, the deployment assembly 50 is manually operated, and allows a user to deploy or retract the deployable wheel units 30 by simply lifting or pushing an actuation lever 52. In a deployed state, the wheel units 30 extend below the ski and allow the operator to easily drive the vehicle, such as a snowmobile, on gravel or paved roads, maintaining control over the vehicle that is superior to a vehicle without wheels, and in a retracted state the wheels are elevated to a position above a bottom surface of the ski 1000 such that the vehicle operates like any other conventional vehicle. The design of the deployment assembly 50 allows for relatively easy deployment of the deployable wheel units 30 from a seated position on the vehicle, without the need for manually removing the ski 1000 and/or wheel units 30, and without even needing to manually lift or elevate the skis 1000.

Figure 6:
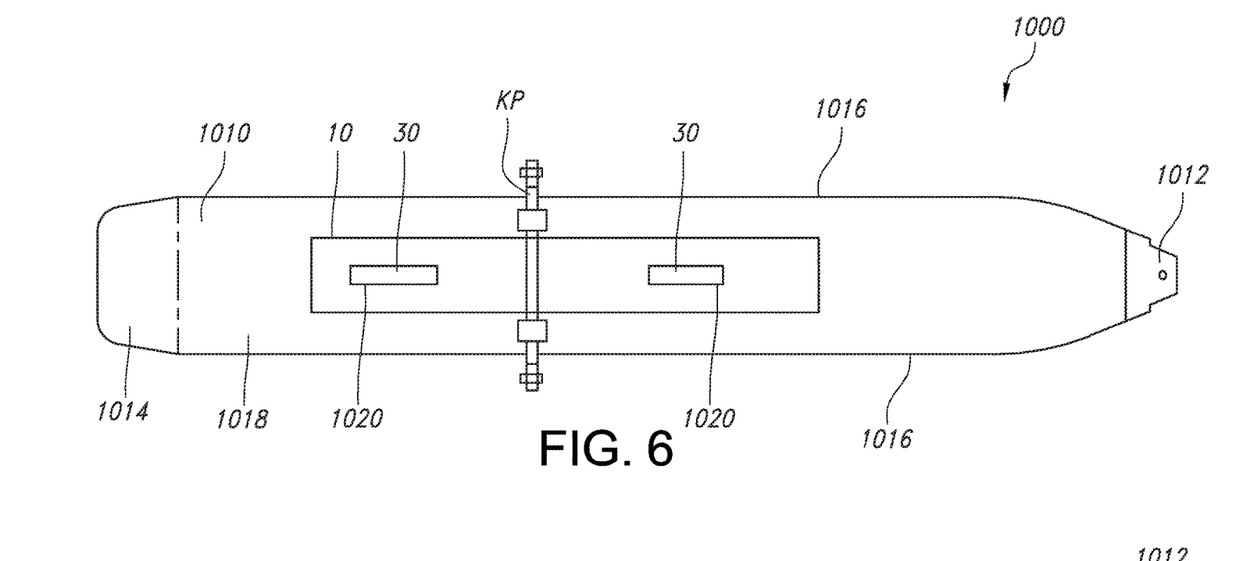
FIG. 6 is a top view of a ski.
Figure 7:
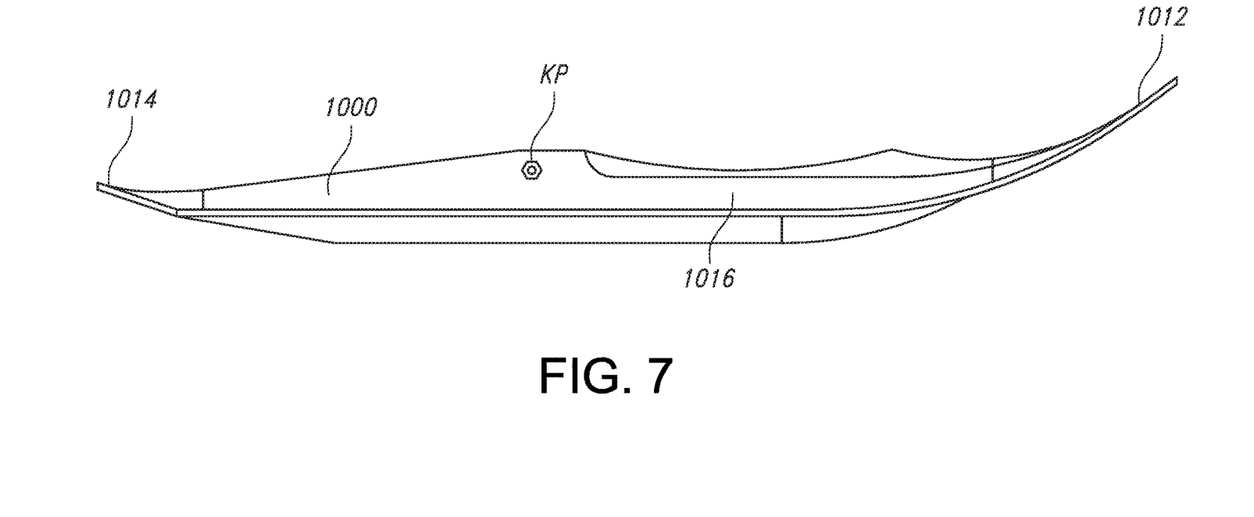
FIG. 7 is a side view of a ski.
Figure 8:
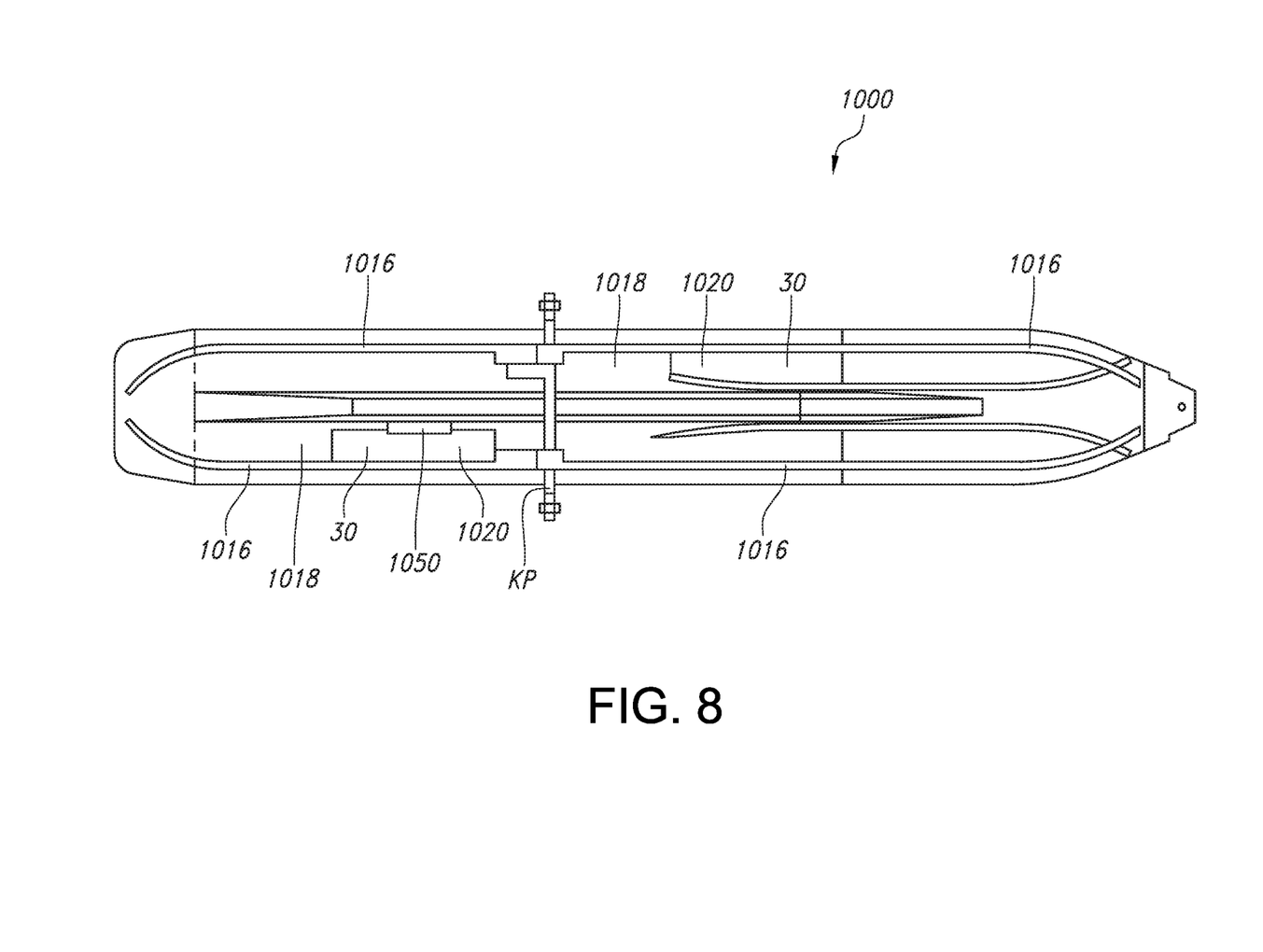
FIG. 8 is a top view of a ski having two-wheel openings that are offset from one another.

The ski 1000, shown in FIGS. 6-8, is a conventional ski having a ski body 1010 that is a molded, pressed, or stamped component. The ski body 1010 has a leading end 1012 and a trailing end 1014, two side walls 1016 extending upward from a ski floor 1018, and a bottom surface that is the ski glide surface. Whenever reference is made hereinafter to "front" or "rear" views of the various components and assemblies, "front" refers to the view facing the leading edge 1012 and "rear" refers to the view facing the trailing edge 1014, when the component or assembly is incorporated into the wheel-unit ready ski 1000.

The deployment system 100 may be incorporated into the ski 1000, shown in FIGS. 6-8, in which case the support structure 10 may be affixed to the top surface of the ski 1000 with openings 1020 created in the ski 1000 to allow the wheel units 30 to deploy and retract through the ski 1000. Alternatively, the deployment system 100 may be attached to the outer side of the ski 1000 sidewall 1016, as shown in FIG. 10.

The embodiment shown includes a first wheel unit 30A and a second wheel unit 30B. The wheel units 30 may be in alignment, as shown FIG. 6 where they are aligned near the middle of the ski 1000, or they may be aligned along the left or ride side of the ski 1000. The wheel units 30 may also be positioned in a non-aligned manner as shown in FIG. 8. It is also possible to construct the deployment system 100 using only one deployable wheel 30, in which case the wheel would be positioned near the midpoint of the ski 1000. Additional wheel units may also be incorporated. A snow guard 39 may be used to prevent snow from entering the area around the wheel units 30.

In the embodiment shown in FIGS. 1-5, the support structure 10 is a conventional saddle or shoe, and includes a floor 12 and two sidewalls 14. The floor 12 has been modified to include openings 16 for the deployable wheel units 30. The support structure 10 is secured to the ski 1000 using conventional fasteners such as bolts and nuts as needed, and two openings 1020 are cut in the ski 1000 to allow the wheel units 30 to deploy and retract through the ski 1000. In most instances, snowmobile skis 1000 have a kingpin KP that is used to attach the skis 1000 to snowmobile's steering assembly (not shown). The kingpin KP may be used to the further secure the support structure 10 to the ski 1000, such that the kingpin passes through the sidewalls 1016 of the ski 100 and the sidewalls 14 of the support structure 10. Additionally, carbide runners (not shown) are typically affixed to the bottom surface of the ski 1000 by a bolt that extends through the floor 1018, exiting on the upper surface of the ski where it is secured by a nut. This carbide affixing means may also be used to secure the deployment assembly 50.

Figure 9:
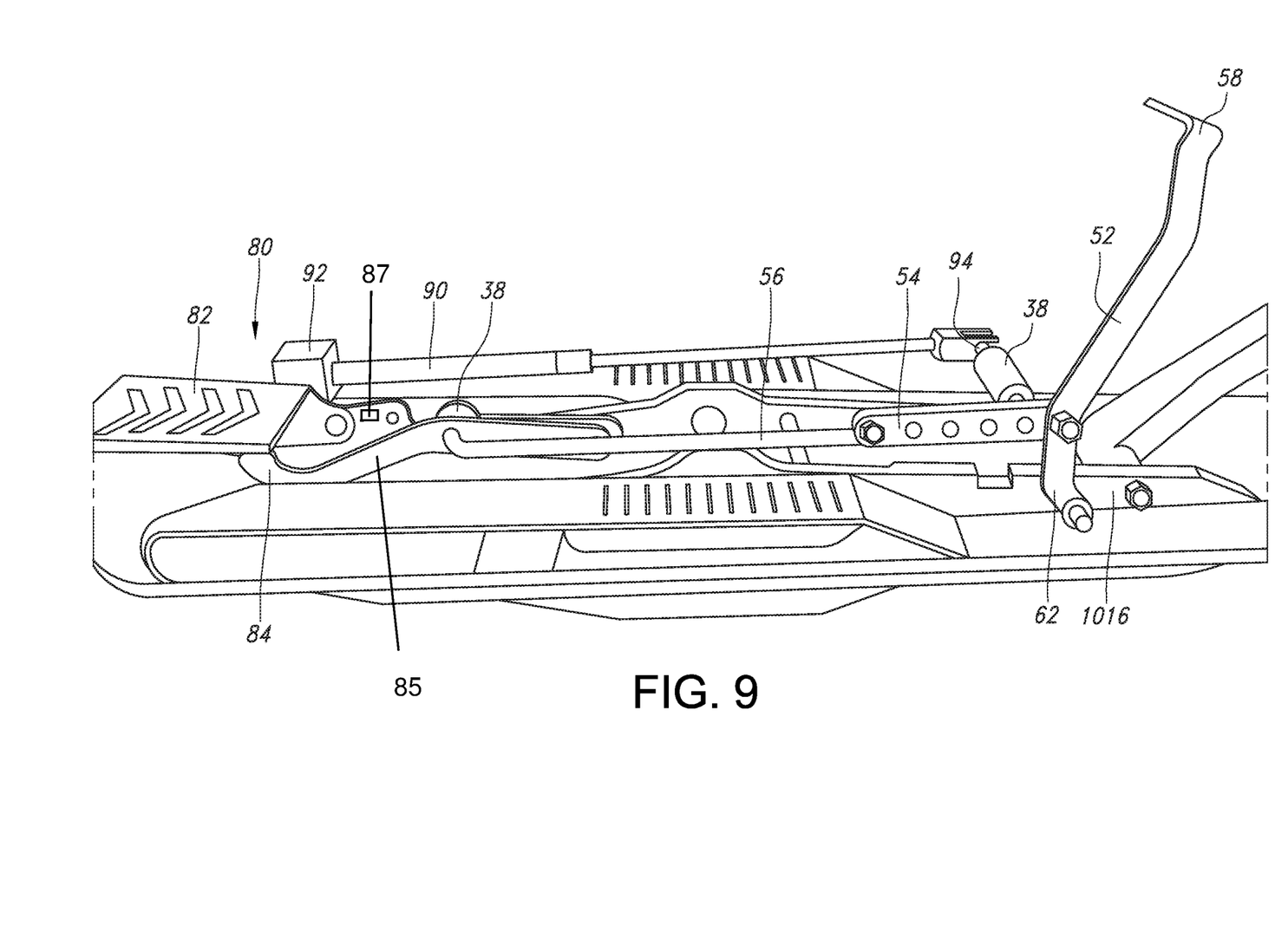
FIG. 9 is a side perspective view of the deployment system having a different point of attachment, a shock absorber, and a locking mechanism.
Figure 10:
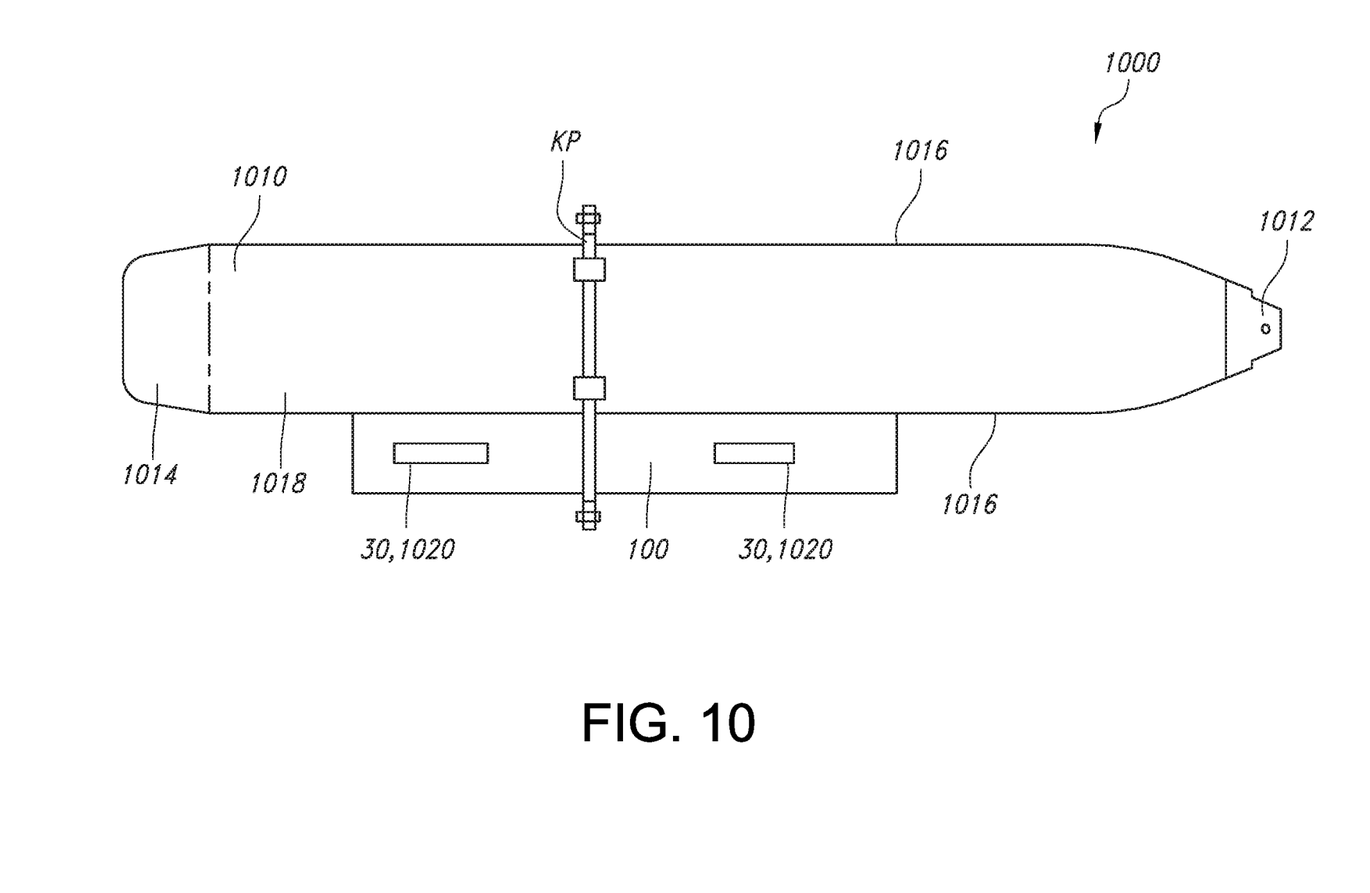
FIG. 10 is a top view of an embodiment having the deployment system mounted on the outside of the ski.

In another embodiment the support structure 10 may be comprised of components that are integrated into the ski 1000, as shown in FIGS. 8-10. In these instances, the deployable wheel units 30 and the deployment assembly 50 may be secured to the ski's sidewalls 1016. In addition, or in the alternative, the wheel units 30 and deployment assembly 50 may be secured to the floor 1018 of the ski 1000 using conventional anchoring means such as an I-bracket 1050. As previously explained, the carbide affixing means may also be used to secure the deployment assembly 50.

Alternatively, the support structure 10 may be affixed to the outside of either side of the ski 1000, for example, by being affixed to the outer portion of the sidewalls 1016 as shown in FIG. 10. In this instance, the King Ping KP has also been extended to further secure the deployment assembly 50. n either instance, the support structure 10 is affixed to the ski S using conventional means such as nuts and bolts, screws, and/or brackets. And, again as previously explained, the carbide affixing means may also be used to secure the support structure 10 and/or deployment assembly 50.

Figure 1:
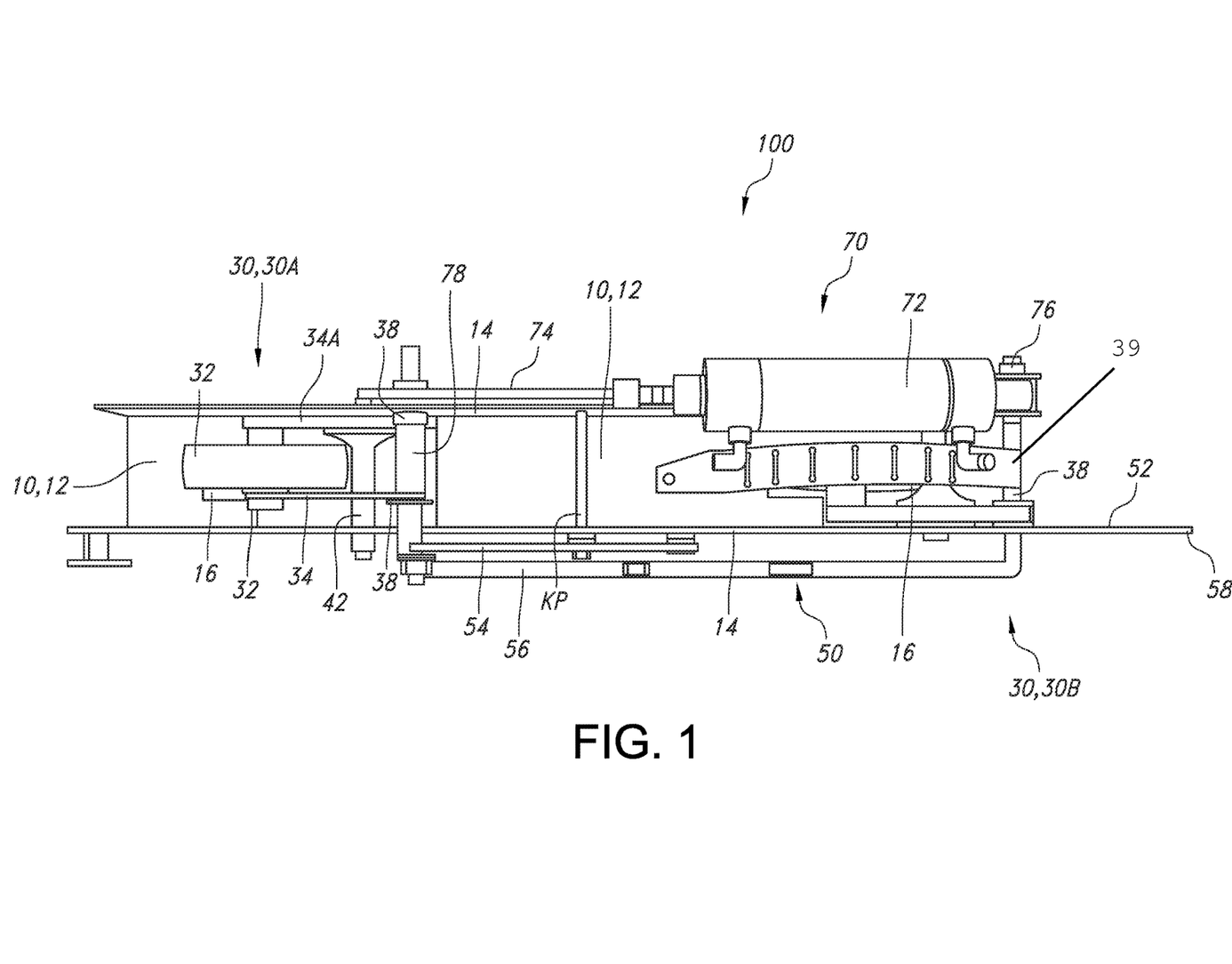
FIG. 1 is a top plan view of the wheel deployment system according to the invention.
Figure 2:
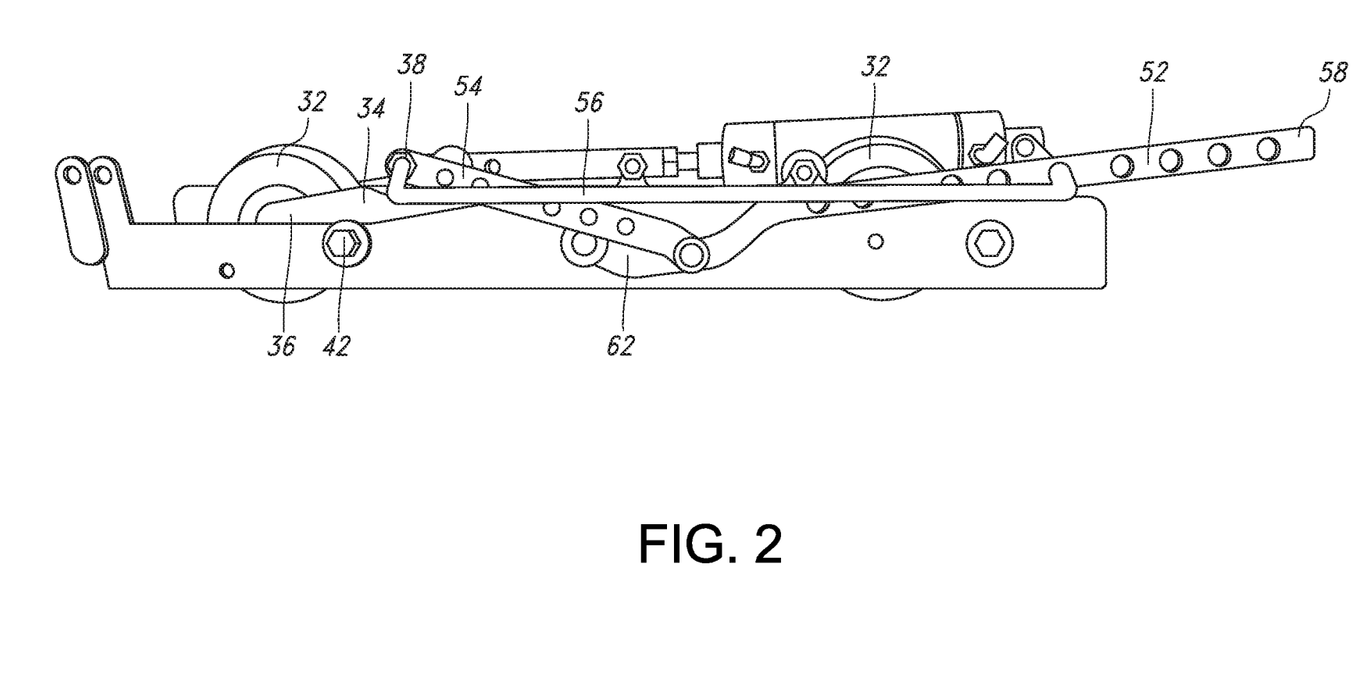
FIG. 2 is a right-side view of the wheel deployment system with the wheels in a retracted position.
Figure 3:
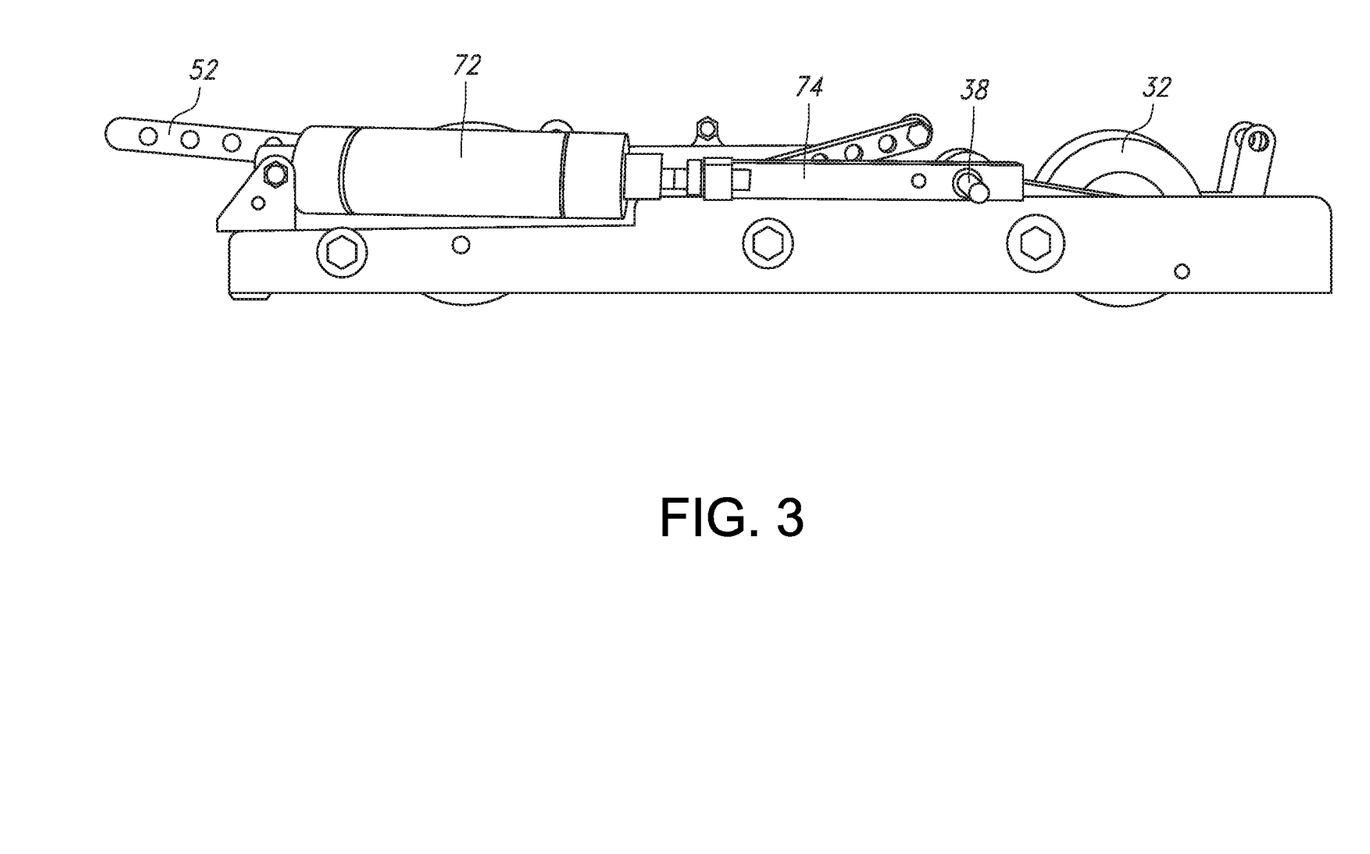
FIG. 3 is a left side view of the wheel deployment system with the wheels in a retracted position.
Figure 4:
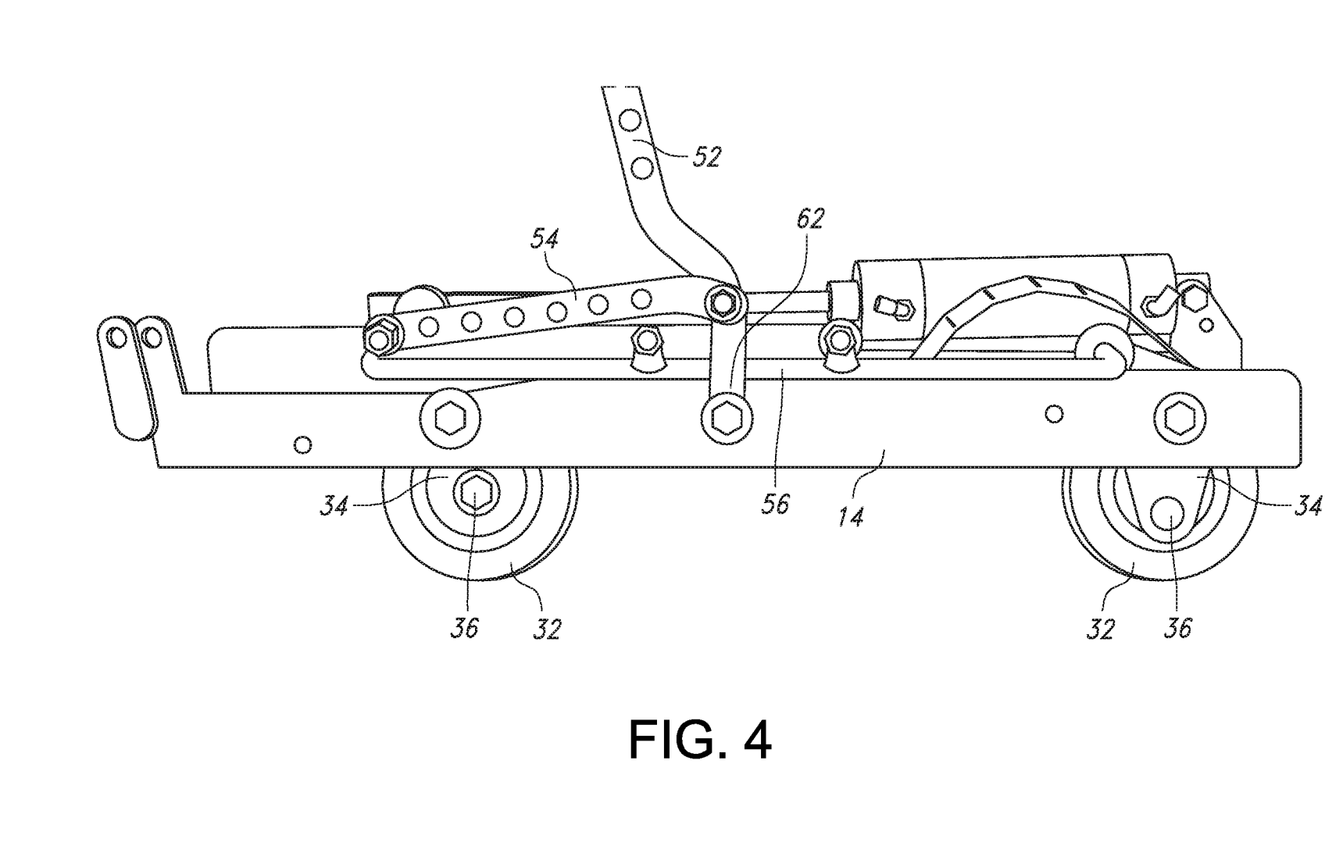
FIG. 4 is a right-side view of the wheel deployment system with the wheels in a deployed position.
Figure 5:
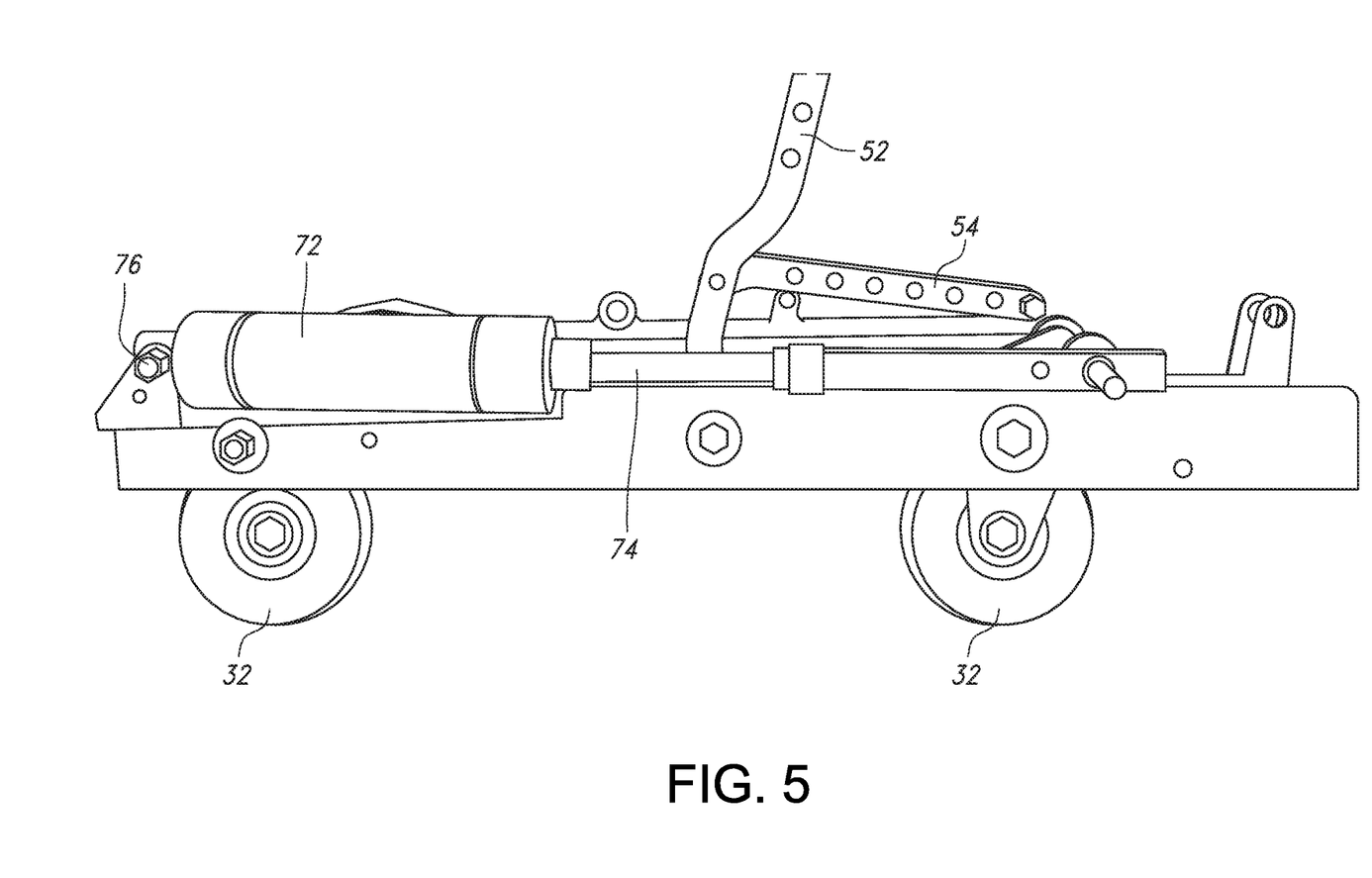
FIG. 5 is a left side view of the wheel deployment system with the wheels in a deployed position.

The wheel units 30, best shown in FIGS. 1, 2 and 4, include a wheel 32 mounted on a cam plate 34. A first position 36 on the cam plate 34 has a sub axle for mounting the wheel 32, a second position 38 that is a coupling means for coupling the cam plate 34 to the deployment assembly 50 and a third position 42 for coupling the cam plate 34 to the support structure 10. A second cam plate 34A, having the same structure, may also be included, as shown with the first wheel unit 30A.

The deployment assembly 50 is a manually operated assembly and includes an actuation lever 52 and a linkage assembly that includes a first coupling link 54 and a second coupling link 56. The actuation lever 52 has a first end 58 that is accessible to a user and a second end 62 that is pivotably affixed to the support structure 10. The first coupling link 54 is affixed to the actuation lever 52 and to the second coupling link 56. The second coupling link 56 couples together the two wheel units 30, connecting to each wheel unit 30 at the wheel units second position 38.

In normal operations the actuation lever is positioned forward and the wheel units 30 are retracted and stored or contained within the support structure 10. As the vehicle moves from a snow-covered surface to a non-snow-covered surface, such as a dirt or paved road, the operator pulls the actuation lever 52 upward and backward towards the rear of the ski. As the actuation lever 52 moves the coupling links 54, 56, deploy the wheels. More specifically, the actuation lever 52 exerts a force on the first coupling link 54 moving it from the lowered position shown in FIG. 2 to the elevated position shown in FIG. 4. As the first coupling link 54 moves it in turn exerts a force on the second coupling link 56, moving the second coupling link 56 backwards towards the rear of the ski 1000 in a relatively level plane. The movement of the second coupling link 56 causes the wheels units 30 to pivot into their deployed positions. As the vehicle re-enters a snow-covered surface, the actuation lever 52 is pushed forward and the wheel units 30 retract.

FIG. 9 illustrates an embodiment of the deployment assembly 50 having the actuation lever 52 positioned near the wheel unit 30 that is in a forward position, closer to the front of the ski 1000. The actuation lever 52, first coupling link 54 and second coupling link 56 operate in the same manner as previously described. The second coupling lever 56 couples the two wheel units 30 as previously described.

FIG. 9 also illustrates a locking mechanism 80 and a shock absorber 90. In general, without a locking mechanism it is likely that the normal operation of the vehicle causes the wheel units 30 to move to a semi-retracted position, however, it is also unlikely that such operation is sufficient to cause the wheel units 30 to move all the way to a fully retracted position. The locking mechanism 80 secures the wheel nits 30 in their retracted or deployed position. The locking mechanism 80 includes a foot pedal 82 that operates a conventional latch 84, the latch 84 secures an arm 85 that is attached to the second coupling link 56 in order to secure the wheel units 30 in the desired position. To deploy the wheel units 30, the foot pedal 82 is pressed and the actuation lever 52 is pulled until the wheel units 30 are in the deployed position, after which the foot pedal 82 is released to secure the latch 84 and, as a result, the deployment assembly 50 and wheel units 30. To retract the wheel units 30 the foot pedal 82 is pressed to release the latch 84 after which the lever 52 may be pressed forward to retract the wheel units 30 and the foot pedal may be released again when the wheel units 30 are fully retracted.

The shock absorber 90 is a conventional shock absorber that is affixed on one end 92 to the support structure 10 and on a second end 94 to deployment assembly 50, and in particular is attached to the coupling means 38. As the wheel units 30 are pulled into the retracted position the shock absorber 90 retracts and absorbs energy. When the locking mechanism 80 is released the shock absorber 90 is released and presses forward in a relatively slow manner so that the skis do not drop to a ground surface and a high speed.

Alternatively, or in addition, a conventional electrical control 87, such as a solenoid, electrical motor, or electrical cam lock, may be used to release the latch 84 rather than the foot pedal 82. The electrical control 87 is affixed to either the support structure 10 or the deployment assembly 50 and uses conventional components to trigger the latch 84. The combination of an electrical control 87 with the shock absorber 90 is a semi-automated deployment system, whereby the shock absorber 90 provides enough force to cause the wheels to retract after the latch 84 is lifted. The latch 84 may also be a conventional spring-loaded latch, such that the force of the spring retracts the wheel units 30 in a semi-automated manner, i.e. the force of the spring is sufficient to cause the wheel units 30 to pivot into their fully retracted position.

An automated deployment assembly 70 is also shown in FIGS. 1-5, and includes a fluid-driven, i.e., pneumatically or hydraulically operated, drive unit comprising a cylinder 72 and a rod 74. This type of actuator is well known in many industries. Thus, the details regarding the drive means for the deployment means are not shown. It is understood that a switch is provided on the control panel of the vehicle so that the operator may actuate the automated deployment assembly 70 while seated on the vehicle. The fixed end of the cylinder 72 is anchored to a bracket 76 on the ski 1000 and the operative end of the rod 74 is linked to the second position 38 on the first wheel units 30A second cam plate 34A. A third coupling link 78, shown in FIG. 1, couples the rod 74 to the second coupling link 56 such that when the cylinder 72 actuates the rod 74 the third coupling link 78 operates the second coupling link so as to deploy the second wheel unit 30B.

The manual deployment assembly 50, semi-automated method, and the automatic deployment assembly 70 may all be included in a single deployment assembly or they may be provided individually or in any combination.

It is understood that the embodiments described herein are merely illustrative of the present invention. Variations in the construction of the wheel deployment system may be contemplated by one skilled in the art without limiting the intended scope of the invention herein disclosed and as defined by the following claims.

What is claimed is:

1. A deployment system for at least one wheel unit adapted for use on a ski-mounted vehicle having one or more skis, the deployment system comprising:
    a support structure affixed to at least one of the one or more skis;
    a deployment assembly that includes an actuation lever that is connected to a linkage assembly, the actuation lever having two ends, a first end that is accessible to a user and a second end that is pivotably affixed to the support structure;
    wherein the linkage assembly includes at least a first coupling link and a second coupling link, the actuation lever is attached to a first end of the first coupling link and a second end of the first coupling link is attached to the second coupling link, the second coupling link is attached to each of the at least one wheel units;
    wherein the support structure is affixed to a top surface on the ski and openings are cut in the ski to allow each of the at least one wheel units to deploy and retract through the ski; and
    wherein the deployment assembly moves the at least one wheel units between a retracted positon above the ski and a deployed position below the ski.

2. The deployment system of claim 1, wherein the support structure is a saddle having a floor and two sidewalls.

3. The deployment system of claim 1, wherein the support structure is a sidewall and floor that are integrated into one of the more of more skis.

4. The deployment system of claim 1, further including a locking mechanism that secures the one more wheel units in a retracted or deployed position.

5. The deployment system of claim 4 wherein the locking mechanism includes a foot pedal that operates a latch and wherein the latch releasably secures an arm attached to the linkage assembly.

6. The deployment system of claim 5, further including an electrical control that operates the locking mechanism.

7. The deployment system of claim 5, further including a shock absorber having a first end that is affixed to the support structure and a second end that is affixed to the deployment assembly, the shock absorber being capable of exerting a force on the deployment assembly that causes the at least one wheel units to move from a deployed position to a retracted position.

8. The deployment system of claim 1, further including an automated deployment assembly having a fluid driven cylinder connected to a rod that is connected to a third coupling link, the third coupling link attached to the second coupling link, and that deploys or retracts the one or more wheel units.

9. A deployment system for at least one wheel unit adapted for use on a ski-mounted vehicle having one or more skis, the deployment system comprising:
    a support structure affixed to at least one of the one or more skis;
    a deployment assembly that includes an actuation lever that is connected to a linkage assembly, the actuation lever having two ends, a first end that is accessible to a user and a second end that is pivotably affixed to the support structure;
    a locking mechanism that secures the one more wheel units in a retracted or deployed position, the locking mechanism including a foot pedal that operates a latch and wherein the latch releasably secures an arm attached to the linkage assembly;

wherein the linkage assembly is connected to the at least one wheel units; and wherein the deployment assembly moves the at least one wheel units between a retracted positon above the ski and a deployed position below the ski.

10. The deployment system of claim 9, wherein the linkage assembly includes a first coupling link and a second coupling link, the actuation lever attached to a first end of the first coupling link and a second end of the first coupling link attached to the second coupling link, the second coupling link being attached to each of the at least one wheel units.

11. The deployment system of claim 9, wherein the support structure is a saddle having a floor and two sidewalls.

12. The deployment system of claim 9, wherein the support structure is a sidewall and floor that are integrated into one of the more of more skis.

13. The deployment system of claim 9, wherein the support structure is affixed to a top surface on the ski and openings are cut in the ski to allow each of the at least one wheel units to deploy and retract through the ski.

14. The deployment system of claim 9, wherein the support structure is affixed to an outer side of the ski and the one or more wheel units deploy and retract on one side of the ski.

15. The deployment system of claim 9, further including an electrical control that operates the locking mechanism.

16. The deployment system of claim 9, further including a shock absorber having a first end that is affixed to the support structure and a second end that is affixed to the deployment assembly, the shock absorber being capable of exerting a force on the deployment assembly that causes the at least one wheel units to move from a deployed position to a retracted position.

17. The deployment system of claim 9, further including an automated deployment assembly having a fluid driven cylinder connected to a rod that is connected to a third coupling link, the third coupling link attached to the second coupling link, and that deploys or retracts the one or more wheel units.

18. A deployment system for at least one wheel unit adapted for use on a ski-mounted vehicle having one or more skis, the deployment system comprising:
 a support structure affixed to at least one of the one or more skis;
 a deployment assembly that includes an actuation lever that is connected to a linkage assembly, the actuation lever having two ends, a first end that is accessible to a user and a second end that is pivotably affixed to the support structure;
 wherein the linkage assembly includes at least a first coupling link and a second coupling link, the actuation lever is attached to a first end of the first coupling link and a second end of the first coupling link is attached to the second coupling link, the second coupling link is attached to each of the at least one wheel units;
 an automated deployment assembly having a fluid driven cylinder connected to a rod that is connected to a third coupling link, the third coupling link attached to the second coupling link, and that deploys or retracts the one or more wheel units; and
 wherein the deployment assembly moves the at least one wheel units between a retracted positon above the ski and a deployed position below the ski.

19. The deployment system of claim 18, wherein the linkage assembly includes a first coupling link and a second coupling link, the actuation lever attached to a first end of the first coupling link and a second end of the first coupling link attached to the second coupling link, the second coupling link being attached to each of the at least one wheel units.

20. The deployment system of claim 18, wherein the support structure is a saddle having a floor and two sidewalls.

21. The deployment system of claim 18, wherein the support structure is a sidewall and floor that are integrated into one of the more of more skis.

22. The deployment system of claim 18, wherein the support structure is affixed to a top surface on the ski and openings are cut in the ski to allow each of the at least one wheel units to deploy and retract through the ski.

23. The deployment system of claim 9, wherein the support structure is affixed to an outer side of the ski and the one or more wheel units deploy and retract on one side of the ski.

24. The deployment system of claim 9, further including a locking mechanism that secures the one more wheel units in a retracted or deployed position.

25. A deployment system for at least one wheel unit adapted for use on a ski-mounted vehicle having one or more skis, the deployment system comprising:
 a support structure affixed to at least one of the one or more skis;
 a deployment assembly that includes an actuation lever that is connected to a linkage assembly, the actuation lever having two ends, a first end that is accessible to a user and a second end that is pivotably affixed to the support structure;
 wherein the linkage assembly includes at least a first coupling link and a second coupling link, the actuation lever is attached to a first end of the first coupling link and a second end of the first coupling link is attached to the second coupling link, the second coupling link is attached to each of the at least one wheel units;
 wherein the support structure is affixed to an outer side of the ski and the one or more wheel units deploy and retract on one side of the ski; and
 wherein the deployment assembly moves the at least one wheel units between a retracted positon above the ski and a deployed position below the ski.

26. The deployment system of claim 25, further including a locking mechanism that secures the one more wheel units in a retracted or deployed position.

27. The deployment system of claim 25 wherein the locking mechanism includes a foot pedal that operates a latch and wherein the latch releasably secures an arm attached to the linkage assembly.

28. The deployment system of claim 25, further including an electrical control that operates the locking mechanism.

29. The deployment system of claim 25, further including a shock absorber having a first end that is affixed to the support structure and a second end that is affixed to the deployment assembly, the shock absorber being capable of exerting a force on the deployment assembly that causes the at least one wheel units to move from a deployed position to a retracted position.

30. The deployment system of claim 25, further including an automated deployment assembly having a fluid driven cylinder connected to a rod that is connected to a third coupling link, the third coupling link attached to the second coupling link, and that deploys or retracts the one or more wheel units.

* * * * *